United States Patent
Krishna et al.

(10) Patent No.: US 11,914,482 B2
(45) Date of Patent: Feb. 27, 2024

(54) SYSTEM AND METHOD FOR ROBUST, EFFICIENT, ADAPTIVE STREAMING REPLICATION APPLICATION PROTOCOL WITH DANCING RECOVERY FOR HIGH-VOLUME DISTRIBUTED LIVE SUBSCRIBER DATASETS

(71) Applicant: Pelatro Pte. Ltd., Singapore (SG)

(72) Inventors: Arun K. Krishna, Bangalore (IN); Pramod K. Prabhakar, Bangalore (IN)

(73) Assignee: Pelatro PTE. LTD., Singapore (SG)

( * ) Notice: Subject to any disclaimer, the term of this patent is extended or adjusted under 35 U.S.C. 154(b) by 290 days.

(21) Appl. No.: 17/532,024

(22) Filed: Nov. 22, 2021

(65) Prior Publication Data
US 2022/0164260 A1     May 26, 2022

Related U.S. Application Data

(60) Provisional application No. 63/116,425, filed on Nov. 20, 2020.

(51) Int. Cl.
| | |
|---|---|
| *G06F 11/14* | (2006.01) |
| *G06F 16/27* | (2019.01) |
| *G06F 11/34* | (2006.01) |
| *G06F 11/10* | (2006.01) |
| *G06F 16/2455* | (2019.01) |

(Continued)

(52) U.S. Cl.
CPC ...... *G06F 11/1464* (2013.01); *G06F 11/1004* (2013.01); *G06F 11/1469* (2013.01); *G06F 11/3452* (2013.01); *G06F 16/2246* (2019.01); *G06F 16/2255* (2019.01); *G06F 16/24568* (2019.01); *G06F 16/273* (2019.01); *G06F 16/283* (2019.01); *G06F 16/285* (2019.01)

(58) Field of Classification Search
CPC . G06F 11/1464; G06F 16/273; G06F 11/1004
USPC .......................................................... 709/232
See application file for complete search history.

(56) References Cited

U.S. PATENT DOCUMENTS

| | | |
|---|---|---|
| 7,130,907 B2 | 10/2006 | Aitken et al. |
| 7,263,537 B1 | 8/2007 | Lin et al. |

(Continued)

*Primary Examiner* — Sibte H Bukhari
(74) *Attorney, Agent, or Firm* — Richard C. Piercy, Esq.; Grell & Watson Patent Attorneys LLC

(57) ABSTRACT

A system and method for a method for facilitating a robust, efficient, adaptive streaming replication application protocol with dancing recovery for high volume distributed subscriber datasets. Master computing devices stream data packets to downstream replicated peer computing devices on a network to maintain live replicated peers. Upon receipt, data packets may be evaluated to determine whether they are next-in-line using efficient checksum disambiguation which enables unambiguous onboarding of next-in-line packets. Links among master and replicated peer devices, as well as replicated peers having replicated peers of their own, can be ranked to determine the most efficient routes and most reliable devices to achieve live continuous streaming of data on potential unreliable devices and links. Link based scoring and popularity rankings among replicated peers and masters achieve optimization of the network of replicated peers. Dancing recovery of replicated peers after being taken offline from masters enables the seamless recovery and rejoining live streaming.

19 Claims, 7 Drawing Sheets

(51) Int. Cl.
*G06F 16/28* (2019.01)
*G06F 16/22* (2019.01)

(56) References Cited

U.S. PATENT DOCUMENTS

| | | |
|---|---|---|
| 7,526,514 B2 | 4/2009 | Chai et al. |
| 8,498,943 B2 | 7/2013 | Ogg |
| 10,082,979 B2 | 9/2018 | Hyde, II et al. |
| 10,698,882 B2 | 6/2020 | Parikh et al. |
| 2006/0184977 A1* | 8/2006 | Mueller ............ H04N 21/4788 |
| | | 348/E7.071 |
| 2018/0285201 A1* | 10/2018 | Bangalore ........... G06F 11/2097 |

\* cited by examiner

SYSTEM AND METHOD FOR ROBUST, EFFICIENT, ADAPTIVE STREAMING REPLICATION APPLICATION PROTOCOL WITH DANCING RECOVERY FOR HIGH-VOLUME DISTRIBUTED LIVE SUBSCRIBER DATASETS

CROSS REFERENCE TO RELATED APPLICATIONS

To the full extent permitted by law, the present U.S. Non-Provisional Patent Application hereby claims priority to and the full benefit of, U.S. Provisional Application No. 63/116,425, filed Nov. 20, 2020, entitled "ROBUST, EFFICIENT, ADAPTIVE STREAMING REPLICATION APPLICATION PROTOCOL WITH DANCING RECOVERY FOR HIGH VOLUME DISTRIBUTED SUBSCRIBER DATASETS", which is incorporated herein by reference in its entirety.

FIELD OF THE DISCLOSURE

The present disclosure is directed to computer-to-computer data streaming. More specifically, the disclosure is directed to the provision and maintenance of a network of connected databases, and efficiently managing data streaming among the databases during periods of network unreliability.

The present disclosure is not limited to any specific file management system, subscriber or customer type, database structure, physical computing infrastructure, enterprise resource planning (ERP) system/software, or computer code language.

BACKGROUND

Many large businesses have a large volume of customers and/or subscribers. To accommodate the large volume of data associated with transactions related to their customers or subscribers, they may use one or more data stores sufficient to store a large volume of data concerning their customers or subscribers, their customers' or subscribers' activity or purchases, and other relevant data about their customers or subscribers. Day-to-day interactions and transactions may be recorded or collected, stored, processed, managed, or used to generate insights about the customers or subscribers. These data stores may often be repositories of information and data by which business and marketing operations may base their actions upon. For instance, an accounts receivable department may access a list of subscribers, each subscriber's invoice date, each subscriber's subscription rate, and each subscriber's method of payment on file in order to manually or automatically invoice all subscribers during a typical billing cycle. In another instance, a marketing department may access a list of subscribers and the length each subscriber has been a customer of the business in order to reward certain customers for their length of patronage. In yet another instance, if a customer acquisition and retention department would want to determine whether the department's customer acquisition and retention initiatives have been effective, it may query the data store(s) for the number of new customers over a period of time, the number of cancelled accounts over a period of time, and possibly the number of overall customers to calculate the overall churn rate of their subscriber base over a period of time. In yet another instance, data, and the underlying insights it can provide, may benefit from being available quickly upon the collection of the data. For instance, a cellular network provider may desire to offer promotions to local participating businesses upon a customer's or subscriber's arrival at a number of destinations. Offering instantly upon arrival, or shortly thereafter, may better encourage a subscriber to be influenced by a promotion or advertisement.

In general, such data may be stored and even analyzed using an Enterprise Resource Planning (ERP) system or platform. Over the years, ERP systems and platforms have evolved to either include or interface with various business platforms such as Customer Relationship Managers (CRMs), subscriber usage monitors, accounting software, distribution platforms, and business intelligence solutions. The data store and corresponding ERP system or platform may function as a transactional system, as online transaction processing databases, as an operational database management system, as a distributed database system offering similar functionality, an/or a combination of the like, whereby the transaction itself may be performed utilizing the ERP system or platform and the resulting data need not be stored on, recorded on, or otherwise copied to or from a separate a centralized data store. The data store and corresponding ERP system or platform may often but not always be stored in a relational database or table on a server connected to a network.

Since these databases usually store highly valuable and even business-critical data, it is important that the data is also saved redundantly somewhere else (i.e., backed up) and readily accessible to numerous business units within a company. IT best practices usually indicate that data be housed in at least two locations, geographically separated, and be backed up routinely, on a schedule (e.g., daily, weekly, etc.). It should be noted that, generally, backup procedures can require the active machine and/or backup machine to go "offline" during a backup process, making it inaccessible during such period of time. This generally means backups of active machines must be scheduled for a period of inactivity (e.g., evenings or weekends) or other provisions must be made to sustain access to the active machine or its equivalent, e.g., redundant master database(s). When dealing with data that is customer and/or subscriber created, rather than employee or agent created, any downtime of a machine may mean decreases in quality of service, inaccessibility, or lost customer/subscriber data. This usually means these systems feature multiple active machines who may shift resources during downtime of any single machine. However, "catching up" a machine after a period of downtime may present other challenges, especially in cases where machines are geographically separated or mediated by an unreliable network and machines thereon.

A continuous challenge to information technology professionals designing and implementing systems and methods of provisioning such utility to businesses has been the establishment of a live network of identical databases capable of both remaining "live" or in sync with a "master", while also receiving new data to accumulate within the network at various points within a geographically separated computerized network. Additional complexities, such as unreliable network connections across vast distances as well as unreliable and/or underperforming machines can further complicate addressing this challenge without requiring significant performance or other tradeoffs. A large portion of this problem has as a root cause the inability to a priori determine whether a data set (or packet) to be stored on a replica received from a master is "next in line." If an intervening packet was not received by the replica, storing the packet out of order can present obvious challenges to the organization of the replica databases. One common method of verifying whether a packet to be stored on a live database from another live database is truly next in line is by sequence number verification. This technique is well known in the art but has various shortfalls in very large systems which have a greater likelihood of one or more connections or systems crashing or otherwise failing. Instead of relying on the reading and writing of data itself for assurances within the system of complete and continuous deposit of data to create a replica database from a master, these systems also must employ separate verification systems and methods in order to constantly check in on data as it arrives, and verify whether the sequence numbers received remain consistent with some expectation of their order of arrival. Additionally, these systems then can often accumulate un-ordered arriving data that then must require processes to assist the replica to catch up to remain in real-time redundancy of the master. This may require the replica database be taken offline and re-formatted based on an updated state, should the replica fall very far behind. This constant checking, verifying, suspending organization, and catching up can become even more complicated if multiple masters and/or multiple replicas are deployed to provide more ready access across geographic distances.

Checksums have provided additional tools to developers wishing to better plan for the development and maintenance of a live system of master and replica databases. Checksums are a digit (or digits) representing the sum of the correct digits in a piece of stored or transmitted digital data, against which later comparisons can be made to detect errors in the data. Checksums are widely employed for the purposes of detecting errors that may have been introduced during the transmission of a data or from a storage of a data, but also have been employed in cryptography, cryptocurrency, and encryption technologies. While they are useful to determine data integrity, they may not show authenticity, as identical data should yield identical checksums. In use, a checksum function or checksum algorithm is generally employed. A replica database receiving data from a master database can perform the checksum function upon each data in its receipt, and maintain record of each checksum for comparison to one received from a master. While such an approach can be used to perform a guaranteed-to-be-reliable check upon data as received by a replica database, it can quickly become grossly inefficient. This is usually because the sender must pass an entire sequence of checksums from the first packet it ever sent, let the replica compare the sequence in its entirety, and onboard only if the sequence matches the checksum it has received and/or maintained over time. Eventually, this approach becomes impractical over time and must be either reset or reconfigured due to its unbound size. For example, the first packet received by a replica database from a master database should need 0 comparisons. The second should need one, and nth should need 'n−1'. Any large 'n' would then require a large number of comparisons and could overburden a machine already requiring optimized performance to stay online. In an ideal world, the replica would receive a data or packet from a master, and would be able to determine or understand a priori whether the data it had received was indeed next-in-line, or the connections and machines would be so reliable such a system would be unnecessary. However, since machines may be unreliable and crash, and since connections may decrease in speed and/or reliability, a system and method for a resource-light assessment of whether a data at a replica is next in line at a master may be incredibly useful in the development and maintenance of such a system.

Therefore, a need exists for a system and method for robust, efficient, adaptive streaming replication application protocol with dancing recovery for high-volume distributed live subscriber datasets. The instant disclosure may be designed to address at least certain aspects of the problems or needs discussed above by providing such a system and method for robust, efficient, adaptive streaming replication application protocol with dancing recovery for high-volume distributed live subscriber datasets.

SUMMARY

The present disclosure may solve the aforementioned limitations of the currently available systems and methods of downtime recovery of data streaming by providing a system and method for robust, efficient, adaptive streaming replication application protocol with dancing recovery for high-volume distributed live subscriber datasets. By leveraging online replicas within recoverability range of a master, by only communicating deltas, and by supporting replicas that fall behind when attempting to rejoin other replicas with online status via negotiation subsequent a "catch up" from recovery manager using dancing recovery, a business may ensure a reliable subscriber backed dataset for telecommunications grade workloads, which may process billions of transactions over millions of subscribers, every day, even when a connection within the network may be unreliable.

In a potentially preferred exemplary embodiment, several improvements to an existing live streaming replica network may be required to fully benefit from the system and method of the disclosure. Briefly, these may include error-free disambiguation logic, simple and efficient dancing recovery, replicated peers, lightweight adaptive replication streaming, continuous reassessment of active masters' performance, and simple popularity-based resolution of concurrent conflicting updates to the same key. Alone or in combination, each of these improvements may contribute to improved archival performance, which will be better understood by those skilled in the art after a full review of this Summary along with the Drawings and Detailed Description below.

In one aspect, the system and method of downtime recovery of data streaming by providing a system and method for robust, efficient, adaptive streaming replication application protocol with dancing recovery for high-volume distributed live subscriber datasets includes error-free disambiguation logic. Error-free disambiguation logic may enable high-speed, reliable replication where packets from a sender may arrive at a receiver (i.e., replicated peer) on any of the multiple available paths, including many via forwards, and yet result in data reconstructed correctly, immediately upon receipt of the next-in-line packet regardless of the stream. Error-free disambiguation logic will be understood in greater detail by those having skill in the art after a more thorough review of the Drawings and Detailed Description.

In another aspect, the system and method of the disclosure may include a simple and efficient dancing recovery procedure, system, or process. The simple and efficient dancing recovery procedure may occur at a receiver, which may be a replicated peer. The replicated peer may continuously remain up-to-date with its sender by utilizing direct streaming combined with real-time on-demand streaming for catch up from recovery manager. This may enable optimal leverage of reliability, even in unreliable networks, by detecting lags when out of sync and quickly latching onto recovery manager for out-of-band streaming.

In yet another aspect, the system and method of the disclosure may include a lightweight adaptive replication streaming strategy. The lightweight adaptive replication streaming strategy may be deployed by recalibrating the messaging topology (route and number of paths) depending on current reliability within the network as may be observed by the receiver (replicated peer).

In yet another aspect, the system and method of the disclosure may include the feature of popularity-based conflict resolution. By determining the overall tendency of any machine using the system and method of the disclosure to determine the best machine and corresponding best link for a replicant, popularity of each machine may be aggregated to determine which machine to "trust" during a conflict resolution.

As a whole, the disclosed system and method may be thought of as a reliable subscriber-backed dataset for telecommunications-grade workloads. This usually may mean requiring data related to billions of transactions over millions of subscribers be saved (and replicated) every day or even continuously. Doing so across multiple replicas maintained across a plurality of distributed systems that are interconnected over an unreliable network may pose unique challenges to creating and maintaining replicas with confidence or any level of confidence. By leveraging online replicas within an acceptable recoverability range of the master, and by only transmitting changes to the replicas from the master, some of these challenges can be address. By also supporting replicas that fall outside this range, fall behind, or otherwise fail to rejoin online status using dancing recovery during negotiation post a catch-up event, the remaining challenges can be addressed.

Other benefits of the disclosed system and method may also be recognized by those having skill in the art. A benefit of the system and method of the disclosure may be their ability to develop reliable subscriber bound datasets with replication for high availability on underlying unreliable networks for telecom grade workloads. Another benefit may be to reduce net entropy in networking by continuously recalibrating active streaming paths in the network depending on measured reliability at any point in time. Another benefit may be the system and method of the disclosure's ability to develop fault tolerant distributed datasets with replicas placed in multiple physical clusters. This may include a local cluster in a unified and consistent manner ensuring application availability in the aftermath of either local failure or cluster failure, or both in the event of a disaster. Another benefit may be the ability to optimize network leverage by using sustained efforts on part of replicated peer(s) to renegotiate with the sender even when the replicated peer(s) are out of band with sender by resorting to continuous catch up using the dancing recovery scheme of the disclosure.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-6, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure solves the aforementioned limitations of the currently available devices and methods of live replication of high-volume distributed live subscriber datasets by providing a system and method for robust, efficient, adaptive streaming replication application protocol with dancing recovery.

Figure 1A:
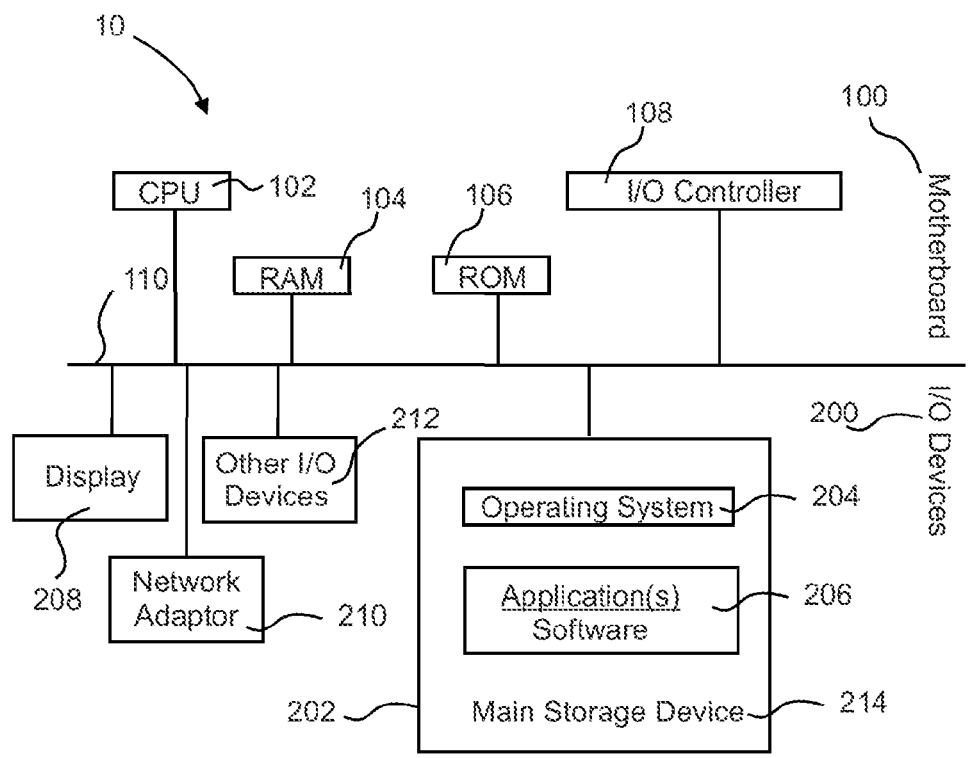
FIG. 1A is a block diagram of a computer system of the present disclosure.
Figure 1B:
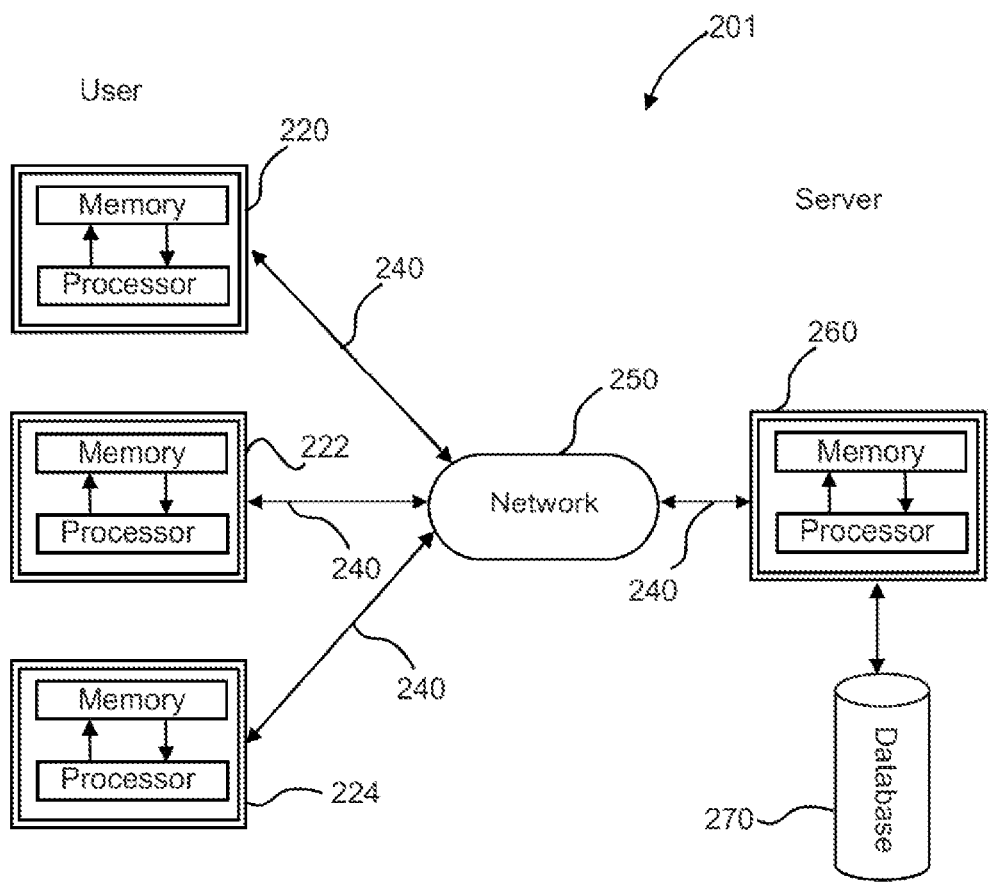
FIG. 1B is a block diagram of a communications system implemented by the computer system in FIG. 1.

In describing the exemplary embodiments of the present disclosure, as illustrated in FIGS. 1A-1B. specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

As will be appreciated by one of skill in the art, the present disclosure may be embodied as a method, data processing system, software as a service (SaaS) or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general-purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object-oriented programming languages, and other conventional programming language may be utilized without departing from the spirit and intent of the present disclosure.

Referring now to FIG. 1A, there is illustrated a block diagram of a computing system 10 that provides a suitable environment for implementing embodiments of the present disclosure. The computer architecture shown in FIG. 1A is divided into two parts—motherboard 100 and the input/output (I/O) devices 200. Motherboard 100 preferably includes subsystems and/or processor(s) to execute instructions such as central processing unit (CPU) 102, a memory device, such as random-access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computing system 10 further preferably includes I/O devices 202, such as main storage device 214 for storing operating system 294 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Processor 102 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1A as a single processor, in some embodiments, processor 102 comprises a plurality of processors. The plurality of processors may be embodied on a single computing device or may be distributed across a plurality of computing devices collectively configured to function as the computing device 10. The plurality of processors may be in operative communication with each other and may be collectively configured to perform one or more functionalities of the computing device 10 as described herein. In an example embodiment, processor 102 is configured to execute instructions stored in memory 104, 106 or otherwise accessible to processor 102. These instructions, when executed by processor 102, may cause the computing device 10 to perform one or more of the functionalities of the computing device 10 as described herein.

Whether configured by hardware, firmware/software methods, or by a combination thereof, processor 102 may comprise an entity capable of performing operations according to embodiments of the present invention while configured accordingly. Thus, for example, when processor 102 is embodied as an ASIC, FPGA or the like, processor 102 may comprise specifically configured hardware for conducting one or more operations described herein. As another example, when processor 102 is embodied as an executor of instructions, such as may be stored in memory 104, 106, the instructions may specifically configure processor 102 to perform one or more algorithms and operations described herein.

The plurality of memory components 104, 106 may be embodied on a single computing device 10 or distributed across a plurality of computing devices. In various embodiments, memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 104, 106 may be configured to store information, data, applications, instructions, or the like for enabling the computing device 10 to carry out various functions in accordance with example embodiments discussed herein. For example, in at least some embodiments, memory 104, 106 is configured to buffer input data for processing by processor 102. Additionally or alternatively, in at least some embodiments, memory 104, 106 may be configured to store program instructions for execution by processor 102. Memory 104, 106 may store information in the form of static and/or dynamic information. This stored information may be stored and/or used by the computing device 10 during the course of performing its functionalities.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1A to be present to practice the present disclosure, as discussed below. Furthermore, the devices and subsystems may be interconnected in different configurations from that shown in FIG. 1A, or may be based on optical or gate arrays, or some combination of these elements that is capable of responding to and executing instructions or operations. The operation of a computer system such as that shown in FIG. 1A is readily known in the art and is not discussed in further detail in this application, so as not to overcomplicate the present discussion.

In some embodiments, some or all of the functionality or steps may be performed by processor 102. In this regard, the example processes and algorithms discussed herein can be performed by at least one processor 102. For example, non-transitory computer readable storage media can be configured to store firmware, one or more application programs, and/or other software, which include instructions and other computer-readable program code portions that can be executed to control processors of the components of system 201 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

Referring now to FIG. 1B, there is illustrated a diagram depicting an exemplary system 201 in which concepts consistent with the present disclosure may be implemented or performed. Examples of each element within the communication system 201 of FIG. 1B are broadly described above with respect to FIG. 1A. In particular, the server system 260 and user system 220 have attributes similar to computer system 10 of FIG. 1A and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably include a computer-readable medium, such as random-access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random-access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1A. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1A). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

System 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, manipulate, and/or otherwise use data exchanged between the user system and the server system. Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, manipulate, and/or otherwise modify data exchanged between the user system and the server system. The communications link 240 may include, for example, a wired, wireless, cable, optical or satellite communication system or another pathway. It is contemplated herein that RAM 104, main storage device 214, and database 270 may be referred to herein as storage device(s) or memory device(s).

Figure 2:
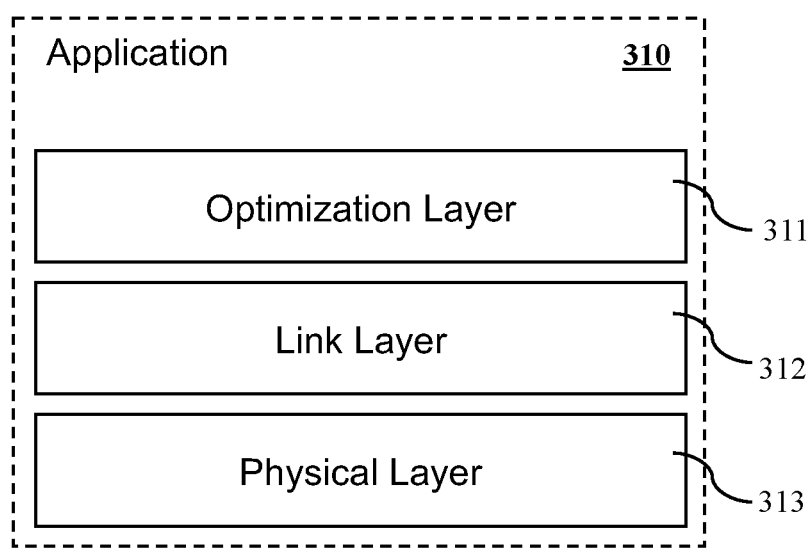
FIG. 2 is a summary block diagram for an exemplary application stack for the system and method of the disclosure.

Referring now specifically to FIG. 2, therein illustrated is a three-layered optimization protocol stack in application space 310, as may be understood by those having ordinary skill in the art. Application space 310 may be a single or multiple application(s) 206 and may be installed thereon various non-transitory computer readable mediums across network 250, including but not limited to main storage device 214 and database 270. Physical layer 313 may be responsible and/or designated for the sending and receiving of packets on an unreliable network. In a potentially preferred embodiment of the system of the disclosure, physical layer 313 may deploy or implement services of a ZMQ or other suitable asynchronous messaging framework. Link layer 312 may be responsible for negotiating streams with replication peers, determining the flow control rate for a particular stream adapting to network reliability and terminating a replication peer stream when it deems the flow rate to be below acceptable threshold or considers the peer to be lagging behind as will be understood in greater detail from a review of FIGS. 3-6 and the accompanying description herein. Link layer 312, may be configured for streaming, multicasting, unicasting, broadcasting, the like and/or combinations thereof. Each of these processes related to both physical layer 313 and link layer 312 may be better understood by those having skill in the art from additional details and examples relevant to FIG. 2 and a review of the remaining Detailed Description. Link layer 312, and its associated tasks it completes, may help to optimize network resources by reducing entropy and not overloading network connections with streams when link layer 312 may have already detected a potential deterioration in reliability levels of the connections. Optimization layer 311 may provide consistent and user-friendly Hash Table styled APIs for access by application components. Optimization layer 311 may also determine, log, or detect any deltas and/or changes in a particular subscriber's data and encoding it as a delta with appropriate checksums, rather than all received data, so that only partial changes flow over the network and not the actual data itself. For instance, if four chunks of 50 bytes out of a total 1000 bytes for a subscriber have changed, then only the relevant change to the data, or the delta worth 50×4, or only 200 bytes would be required for computation, compression, encryption and transmission to link layer 312. This saves a total of 800 bytes for each various step on the sending database alone, and significantly reduces the required data transmission over the network, thereby optimizing network bandwidth, especially when real world data may be much greater than 1000 bytes and deltas may be much lower, percentage-wise. Deltas reflecting changes to actual data may be encoded as datagrams and pushed into the network by physical layer 313 to the corresponding intended devices on the network. Masters may then stream write-ahead logs (WALs) to an archive manager, which may receive them in "Hold-Mode" in order to ensure that the sender is blocked until such time the WALs may be persisted to the disk. In parallel, the senders and/or masters may stream the deltas to its replicate-peers or stand-by systems using best-effort semantics wherein slaves, recipients, and/or replicas within the bounds of sliding window 510 (see FIG. 5) on the server may stay intact and "alive" (i.e., up-to-date with master) while those unable to catch up are asked to come-to-latest checkpoint using services of e.g., RMAN and again offer for re-negotiation. Sliding window 510 may also be understood as a subset of the most recent "N" packets, where "N" is a positive integer sufficient to capture sufficiently recent packets (e.g., 500 most recent packets). The above application stack, its features and benefits, and potential implementations may be even better understood by those having skill in the art from a review of the remaining FIGS. 1-6, in addition to the accompanying Detailed Description.

Figure 3:
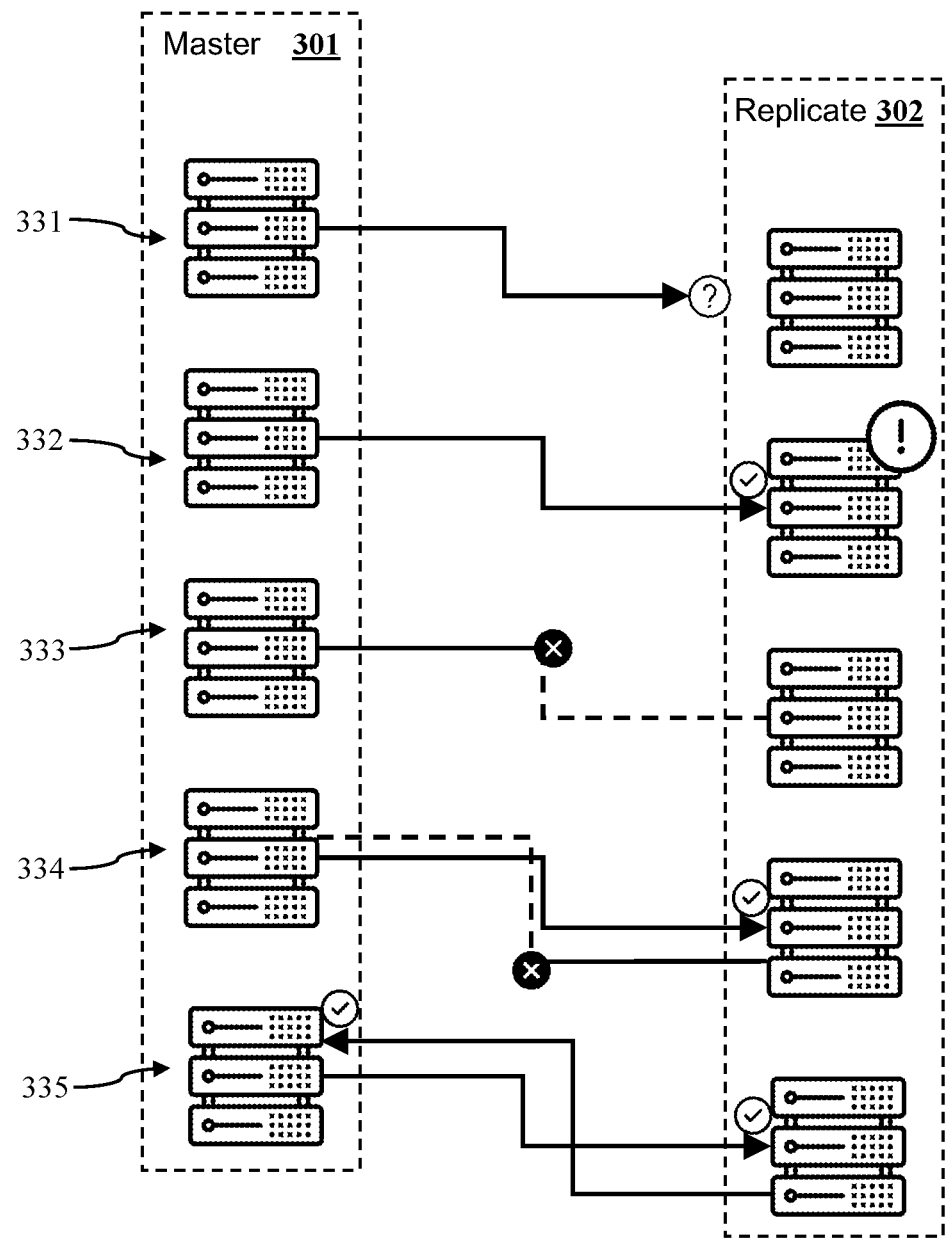
FIG. 3 is a block diagram of exemplary messaging interactions among master computing devices and their replicated peer computing devices.

Referring now specifically to FIG. 3, therein illustrated is a block diagram of exemplary messaging interactions among master exemplary computing devices 301 and their replicated peer exemplary computing devices 302. For the sake of simplicity, one of each exemplary computing device is illustrated for each potential interaction and FIG. 3 is provided for illustrative purposes only. Each of master exemplary computing devices 301 and replicated peer exemplary computing devices 302 may include one, some, many, or all features of computing system 10 as described therein FIG. 1A and may subsist and/or be connected in an arrangement according to system 201 of FIG. 1B. A system and method according to the disclosure may be and likely is more complicated than may be illustrated in FIGS. 1A, 1B, and 3, and may involve multiple master exemplary computing devices 301 and multiple replicated peer exemplary computing devices 302 and even multiple varying arrangements of system 201. Additionally, as will be understood by those having skill in the art, the terms "master" and "replicated peer" may refer to an interaction between or among devices and a device having properties of a master in relation to its replicated peer may be a replicated peer itself and vice versa. Those having ordinary skill in the art know that while the terms master and replicated peer may be distinct and non-interchangeable, devices during the ordinary operation of complex systems as herein described may be instructed to or otherwise cause to be changed from one state into another or even exist simultaneously as a master device and replicated peer, depending on the perspective of observations at any given time.

Accordingly, further illustrated therein FIG. 3 is first failed transmission scenario 331, second failed transmission scenario 332, third failed transmission scenario 333, failed confirmation scenario 334, and successful transmission and confirmation scenario 335. Various symbols and/or icons are used therein FIG. 3, which may be self-explanatory. Nevertheless, it should be noted that solid lines connecting master exemplary computing devices 301 with replicated peer exemplary computing devices 302 may represent working communication lines physically connecting the devices or may similarly represent a working network, along which a message may be sent. Arrows along solid lines may represent directionality of said message. Broken lines may represent any number of scenarios where a transmission and/or message with an intended recipient ceases to transmit within a network or along a physical communication line. The letter X within a circle may represent a location where said transmission and/or said message ceases to proceed along an intended path to said recipient. A circle having a question mark (?) may represent scenarios where upon receipt, a recipient may fail to recognize, understand, or proceed with recording the incoming transmission and/or message. Finally, a checkmark may represent scenarios where at the place of the checkmark, everything has proceeded as planned with respect to the transmission and receipt of transmissions and/or messages at a device, on a network, etc. With that in mind, these scenarios are exemplary only and many other scenarios may be applicable to the utility of the system and method disclosed herein.

Turning now to the specific scenarios illustrated therein FIG. 3, first failed transmission scenario 331 may occur when master exemplary computing devices 301 successfully broadcast a transmission and/or message to a network with replicated peer exemplary computing devices 302 as an intended recipient. As utilized herein, the terms broadcast, multicast, unicast, and transmission may be interchangeable. Either upon receipt or prior to receipt, something occurs to either a networked device responsible for directing the message to replicated peer exemplary computing devices 302 or replicated peer exemplary computing devices 302 themselves which causes a failure to properly handle message. Other scenarios where master exemplary computing devices 301 broadcast a transmission to replicated peer exemplary computing devices 302, which in turn fail to accept or receive said transmission may be included in this first failed transmission scenario 331. Second failed transmission scenario 332 may include a variety of situations where upon receipt of a successful transmission from master exemplary computing devices 301 to replicated peer exemplary computing devices 302, some error occurs at one or more of replicated peer exemplary computing devices 302, which in turn causes either a failure to record a data from the transmission onto main storage device 214 (or other non-transitory computer readable media) or otherwise does not function to confirm a receipt of the broadcast via another broadcast to master exemplary computing devices 301. Third failed transmission scenario 333 may occur for a variety of reasons, depending on the configuration of system 201. For instance, a broadcast could be made from master exemplary computing devices 301 to replicated peer exemplary computing devices 302 and in turn one of replicated peer exemplary computing devices 302 is established as one of a downstream master exemplary computing devices 301. Failing to rebroadcast to its own replicated peer exemplary computing devices 302, the downstream transmissions may fail. Additionally, a connection such as communications link 240 may suffer from a downtime event or other failure to communicate to network 250, thereby causing replicated peer exemplary computing devices 302 to not receive the transmission. Failed confirmation scenario 334 may occur when master exemplary computing devices 301 properly transmits, replicated peer exemplary computing devices 302 properly receives, and replicated peer exemplary computing devices 302 properly broadcasts confirmation of the receipt of the transmitted data, but a similar network 250 failure to that of third failed transmission scenario 333 occurs during the confirmation broadcast from replicated peer exemplary computing devices 302. Finally, Successful transmission and confirmation scenario 335 may occur when transmission and confirmation between master exemplary computing devices 301 and replicated peer exemplary computing devices 302 proceeds according to plan/design and ordinary functionality is not interrupted. Given that of these scenarios, only that of successful transmission and confirmation scenario 335 can ensure at master exemplary computing devices 301 that replicated peer exemplary computing devices 302 are properly functioning and in receipt of any given transmission, total functionality of devices and connections among network 250 may be required to ensure any given replicated peer exemplary computing devices 302 contains sufficiently real-time versions of comprehensive data stored on master exemplary computing devices 301. Therefore, unreliability of any component of or connection between/among either master exemplary computing devices 301 or replicated peer exemplary computing devices 302 may threaten the up-to-date credibility when accessing replicated peer exemplary computing devices 302. This may in turn cause increased reliance on master exemplary computing devices 301, causing increased use of resources of each computing system 10 utilized therein, and in turn likely to cause increased wear on each computing system 10 utilized therein and/or decreased performance of each computing system 10 or the overall system 201. Due to this, one of ordinary skill in the art may determine that confirmation of proper receipt of a transmission from master exemplary computing devices 301 to replicated peer exemplary computing devices 302 may not be required. While that may eliminate downsides explained in scenarios such as failed confirmation scenario 334, it comes with the tradeoff that master exemplary computing devices 301 may never detect whether any broadcast is ever received by any of replicated peer exemplary computing devices 302. Furthermore, a replicated peer exemplary computing devices 302 which serves as a master exemplary computing devices 301 for downstream replicated peer exemplary computing devices 302 may only further complicate these issues. Those having ordinary skill in the art will therefore recognize the method and system disclosed herein as well as each of various steps, sub-steps, components, and sub-components and their corresponding advantages, to address this issue to allow downstream replicated peer exemplary computing devices 302 to continue functioning without confirming receipt of transmission from master exemplary computing devices 301, and serve as master exemplary computing devices 301 themselves, thereby increasing the overall functionality of system 201. By easily determining whether a transmission from one of a master exemplary computing devices 301 is a next-in-line transmission via simple mathematical calculations and/or observations regarding each transmission received at replicated peer exemplary computing devices 302, replicated peer exemplary computing devices 302 may continually ensure up-to-date status, thereby continuing service to downstream replicated peer exemplary computing devices 302 as master exemplary computing devices 301. This will become more apparent to those skilled in the art from the following Detailed Description of exemplary embodiments when read in light of the accompanying FIGS. 4-6.

Figure 4:
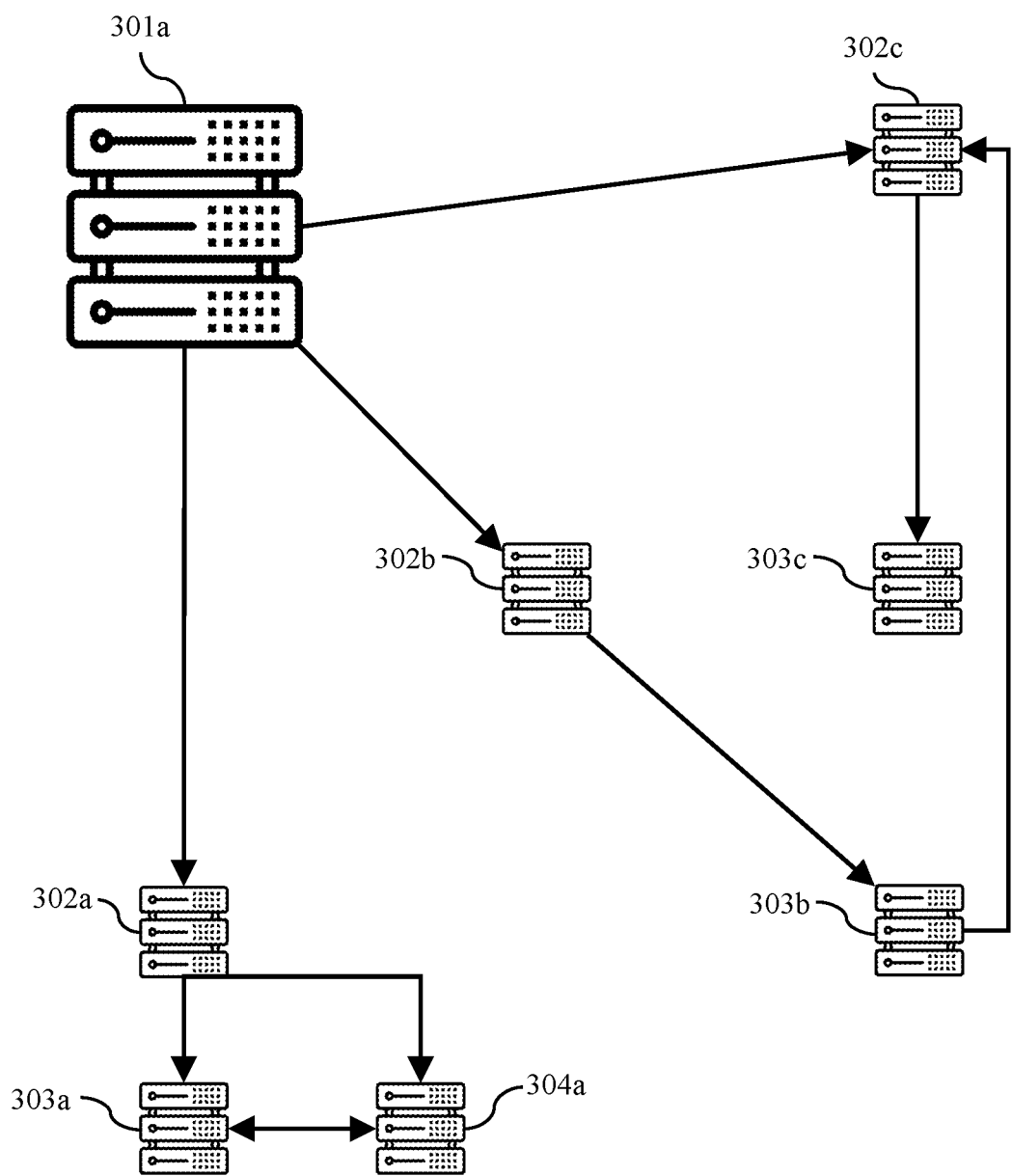
FIG. 4 is a block diagram of an exemplary system of replicated peers.

Referring now specifically to FIG. 4, therein illustrated a block diagram of an exemplary system of replicated peers according to the system and method of the disclosure. As would be understood by those skilled in the art, this block diagram is not drawn to scale, but may be scaled according to order of importance of system 201. Starting with upstream master 301a, a broadcast may be made to first upstream replicated peer 302a, second upstream replicated peer 302b, and third upstream replicated peer 302c. It should be reiterated that while each of first upstream replicated peer 302a, second upstream replicated peer 302b, and third upstream replicated peer 302c may serve from this perspective as replicated peers of upstream master 301a, they may also serve as master exemplary computing devices 301 to replicated peer exemplary computing devices 302, as explained above. Furthermore, though each of first upstream replicated peer 302a, second upstream replicated peer 302b, and third upstream replicated peer 302c may be indicated and described as "upstream", they are only upstream in relation to other replicated peer exemplary computing devices 302, and are in fact downstream of upstream master 301a. Upon receipt of the transmission(s)/broadcast(s) from upstream master 301a, first upstream replicated peer 302a, second upstream replicated peer 302b, and third upstream replicated peer 302c may further re-transmit and/or rebroadcast a portion or all of said transmission(s)/broadcast(s) to other downstream replicated peer exemplary computing devices 302. As illustrated herein, for exemplary purposes only, first upstream replicated peer 302a may do so to first secondary replicated peer 303a and secondary/tertiary replicated peer 304a, second upstream replicated peer 302b may do so to second secondary replicated peer 303b, and third upstream replicated peer 302c may do so to both third secondary replicated peer 303c and second secondary replicated peer 303b. It should be noted that each of secondary/tertiary replicated peer 304a and third upstream replicated peer 302c are illustrated to receive transmission/broadcast from two upstream masters. This may be a common arrangement in the disclosed systems, and in fact, replicated peer exemplary computing devices 302 may receive transmission/broadcast from any number of master exemplary computing devices 301. Given this added complexity, each of replicated peer exemplary computing devices 302 must then perform some action on the data received in order to determine whether and where to store next-in-line transmissions upon receipt. Major benefits may be achieved due to this redundancy in transmission and actually increase the overall stability of system 201, thanks to improvements as herein disclosed. This will become more apparent to those skilled in the art from the following Detailed Description of exemplary embodiments when read in light of the following FIGS. 5-6.

Figure 5:
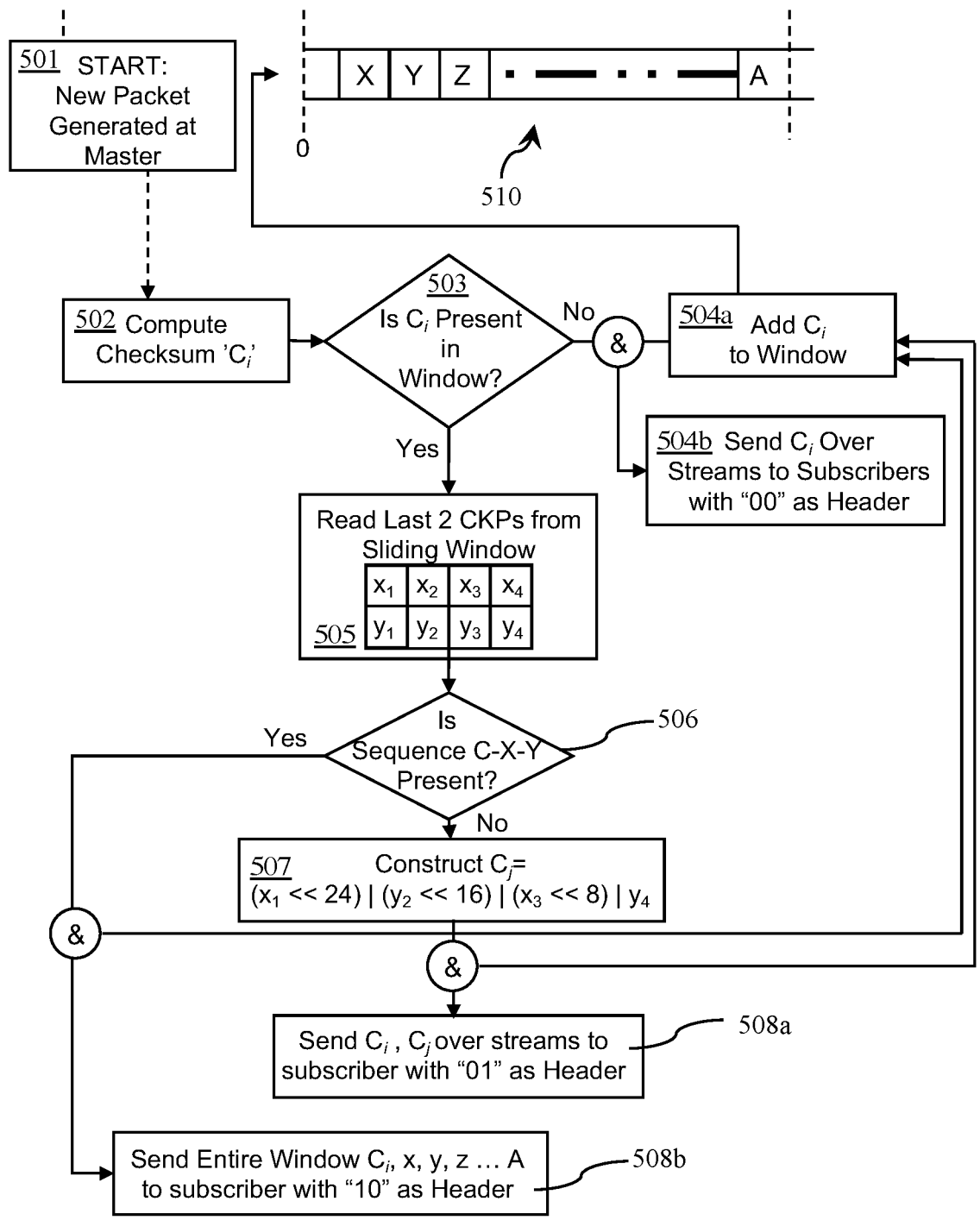
FIG. 5 is a detailed flowchart diagram of an exemplary system and method of efficient checksum-based disambiguation.

Referring now specifically to FIG. 5, therein illustrated is detailed flowchart diagram of an exemplary system and method of efficient checksum-based disambiguation, according to the present disclosure. Due to the nature of the process of unambiguously onboarding packets from one of each master exemplary computing devices 301 onto downstream replicated peer exemplary computing devices 302, and the logic that is therein required, additional background may be necessary for those skilled in the art to fully comprehend the processes described hereafter in order to first determine whether a packet arriving is next-in-line using checksum comparison. Accordingly, the background herein described is designed to efficiently facilitate next-in-line packet determination at each replicated peer exemplary computing devices 302 by relying on checksums, and logic related to the utility of checksums as described above. Instead of relying on packets to have a continuous sequence number without gaps (due to the practical challenges outlined above) and because of the near impossibility of guaranteeing that there shall be no missing numbers or holes when working with software systems where crashes cannot be ruled out, the replicated peer exemplary computing devices 302 may be instead required to perform a set of progressive checks to determine whether the packet it received next is actually next-in-line with the last successfully onboarded packet. Also described briefly above, other guaranteed checks with heavy efficiency trade-offs may be having a sender or master exemplary computing devices 301 to also transmit instead the entire sequence of checksums from the first packet it ever sent, enable or configure each replicated peer exemplary computing devices 302 to compare said sequence in its entirety and onboard only if the sequence matches the one it has received over time. As described above, this approach may become very impractical very quickly due to the unbound size of the checksums being transmitted, received, and compared by various devices on system 201. The first packet should not require a comparison, the second packet may only require one, but the "n"th packet would require 'n–1'. For a system 201 having numerous master exemplary computing devices 301 broadcasting to numerous downstream replicated peer exemplary computing devices 302, which then may retransmit/rebroadcast as master exemplary computing devices 301, each of these devices broadcasting and transmitting real time information upon receipt, over the course of the first day alone may suffer extreme resource needs for the confirmation of next-in-line alone.

Recognizing the utility of checksum logic to disambiguation, additional logic may be relied upon to provide each replicated peer exemplary computing devices 302 with sufficient confidence to assemble the packet it has received from one or more of master exemplary computing devices 301 as a next-in-line packet for storage and downstream broadcast and/or transmission. Ideally, each replicated peer exemplary computing devices 302 could check each packet in its receipt for only once in order to decide whether the arriving packet is next-in-line or not. Logically, it is not possible to be certain using a single checksum alone, because though identical data would contain identical corresponding checksums, identity of checksums is recognized by those skilled in the art to be insufficient to guarantee the corresponding data is identical. The proposed technique of the disclosure may instead use best-efforts on each replicated peer exemplary computing devices 302 to decide if the packet(s) arriving from one or more master exemplary computing devices 301 is next-in-line with one comparison while progressively using more comparisons only when the information it has is not sufficient to make the decision unambiguously with just one comparison. The technique which may be best adapted to the scenarios of the disclosure may use 4-byte checksums, though the disclosure is not so limited and may provide similar utility using any length checksums.

Turning now to the steps and features of FIG. 5, the process to ensure next-in-line packet status of a packet arriving from master exemplary computing devices 301 to a plurality of replicated peer exemplary computing devices 302 may be understood to begin when a new packet is generated at master exemplary computing devices 301, illustrated as packet generation and transmission step 501. This packet may include any variety of data in any form, and may be considered primary data in that it does not require further processing to provide valuable business insights, but may be specifically received from systems monitoring the activity of subscribers and/or users of various electronic services capable of such monitoring by a service provider (e.g., a cellular data network, a social media network, a media streaming service, etc.). Due to nature of such user/subscriber data, including but not limited to the volume of data required to store, the volume and speed of incoming data required to store, and the potential geographic separation of users/subscribers, those skilled in the art will recognized the additional complexity of additionally managing replicated peer exemplary computing devices 302 with these specific types of user data may be ideal candidates for a system and method of the disclosure being so implemented. Turning now to sub-steps that may be included at packet generation and transmission step 501, in addition to receiving data from a plurality of sources and preparing a data packet for transmission to replicated peer exemplary computing devices 302, master exemplary computing devices 301 may further generate a checksum based upon said data packet and may further maintain sliding window 510 of the last 'N' checksums where 'N' is a number chosen heuristically depending on prevailing network 250 conditions. 'N' may start, by way of example and not limitation, with a default value of 1000, but can increase if there is a collective demand from and/or among downstream replicated peer exemplary computing devices 302. Increasing this value may require "widening" the window as each of replicated peer exemplary computing devices 302 begin to become back into synchronizion within stipulated time, and decreasing this value can be done if devices on network 250, namely replicated peer exemplary computing devices 302 or monitoring devices on network 250 assess that sufficient and/or all replicated peer exemplary computing devices 302 are synchronizing well-in-time without the need for a "wide" window, as will be understood from further steps included herein FIG. 5. Increments and decrements may each happen, for instance, in units of 100 with 500 being the absolute lower limit. As may be understood by those having ordinary skill in the art, there may be no identifiable absolute upper limit. When a new packet is generated or received for broadcast at master exemplary computing devices 301, master exemplary computing devices 301 may compute, for example, the 4-byte checksum 'Ci' at checksum computation step 502 and perform a look-up in sliding window 510 to see if 'Ci' is present at verification step 503. If it is not present, then, master exemplary computing devices 301 may perform checksum checkpoint step 505 and read the last packet's checksum 'X' (or 0 if there is no previous packet) and, at checksum broadcast step 504b, may broadcast, for example, an 8-byte Ci concatenated with X over network 250 to downstream replicated peer exemplary computing devices 302 prefixed by a header, such as '00' (2 bits). The receiver or replicated peer exemplary computing devices 302 also may maintain its own sliding window 510 of last 'N' checksums. When the arriving packet's checksum header is, according to this example, '00', it only looks up if the head of sliding window 510 contains 'X'. If so, then replicated peer exemplary computing devices 302 may deem the arriving packet to be next in line and adds 'Ci' to head of sliding window 510. If it does not match, the replicated peer can be certain the packet is not next-in-line and can either discard the arriving packet or store for later evaluation. Again, at the sender or one of master exemplary computing devices 301, if look up for 'Ci' in its sender window succeeds, then, at checksum checkpoint step 505, they may read the last two checkpoints 'X' 'Y' from sliding window 510 and perform a look up to see if that sequence 'XY' repeats anywhere in the window at lookup sequence step 506. If it doesn't repeat, then at checksum construction step 507, master exemplary computing devices 301 may compute and/or construct another checksum 'Cj' using the logic illustrated and described at checksum computation step 502. At constructed checksum transmission step 508a, master exemplary computing devices 301 may broadcast to downstream replicated peer exemplary computing devices 302, for instance an 8 byte 'Ci' concatenated over network 250 prefixed by a header, for instance, '01' (2 bits). Thus, when a packet arriving at replicated peer exemplary computing devices 302, if said packet's checksum header is '01', the replicated peer exemplary computing devices 302 may be programmed to recognize that it first must reconstruct 'Cj' locally by using the same logic described in checksum computation step 502 and/or checksum construction step 507 and then compare with locally stored constructed 'Cj' with 'Cj', received in the arriving packet. If these values match, then, the arriving packet may be onboarded as next-in-line, the corresponding 'Ci' may be added sliding window 510 at window addition step 504a. If these values do not match the arriving packet may be considered not next-in-line and may be discarded.

At the sender and/or master exemplary computing devices 301, if sequence 'XY' was found locally elsewhere in sliding window 510 at lookup sequence step 506, it may broadcast to downstream replicated peer exemplary computing devices 302 the entire sliding window 510 as checksum with '10', for example, as checksum header at sliding checksum broadcast step 508b. This way, at the receiver or when replicated peer exemplary computing devices 302 receive the broadcast transmitted at sliding checksum broadcast step 508b, if checksum header in arriving packet is '10', then, the arriving sliding window 510 may be compared for an exact prefix match with the local sliding window 510, and if it succeeds, the arriving packet may instead be onboarded as next-in-line with 'Ci' added to sliding window 510 at window addition step 504a. Those having ordinary skill in the art may recognize the width of the sliding window 510 may serve as a threshold for replicated peer exemplary computing devices 302 to stay within direct recoverability range of a sender or master exemplary computing devices 301. If one or more of replicated peer exemplary computing devices 302 fall out of range with master exemplary computing devices 301, it may be determined by size of sliding window 510 and, depending on configuration of an implementation of the disclosed system and method, the replicated peer exemplary computing devices 302 out-of-range to a specified extent may be then subject to dancing recovery features also disclosed herein. As may be further understood by those having skilled in the art, using the logic as herein illustrated and described according to FIG. 6, the range of checksums may be $-2^{31}$ to $2^{31-1}$ and by nature, since checksums are unlikely to overlap and/or clash readily, the technique to determine whether a packet received is next-in-line may be accomplished on the vast and/or overwhelming majority of arriving packets, and may be determined as next-in-line or not-next-in-line using just one checksum comparison, which decreases strain on transmission lines/bandwidth, machine resources, etc., and may be accomplishable using simple checksum creation, comparison check functions, and mathematics alone. For instance, chances of two identical checksums repeating or occurring in sliding window 510, depending on size, may be extremely low. Even in such rare cases, a comparison of the entire sliding window 510 may reconcile such a discrepancy. Therefore, under practical operating cases, techniques, features, steps, and design of the system and method disclosed herein FIG. 5 may closely approximate an ideal scenario where exactly one comparison alone is needed at each of replicated peer exemplary computing devices 302 to determine how a next-in-line arriving packet shall be handled.

Figure 6:
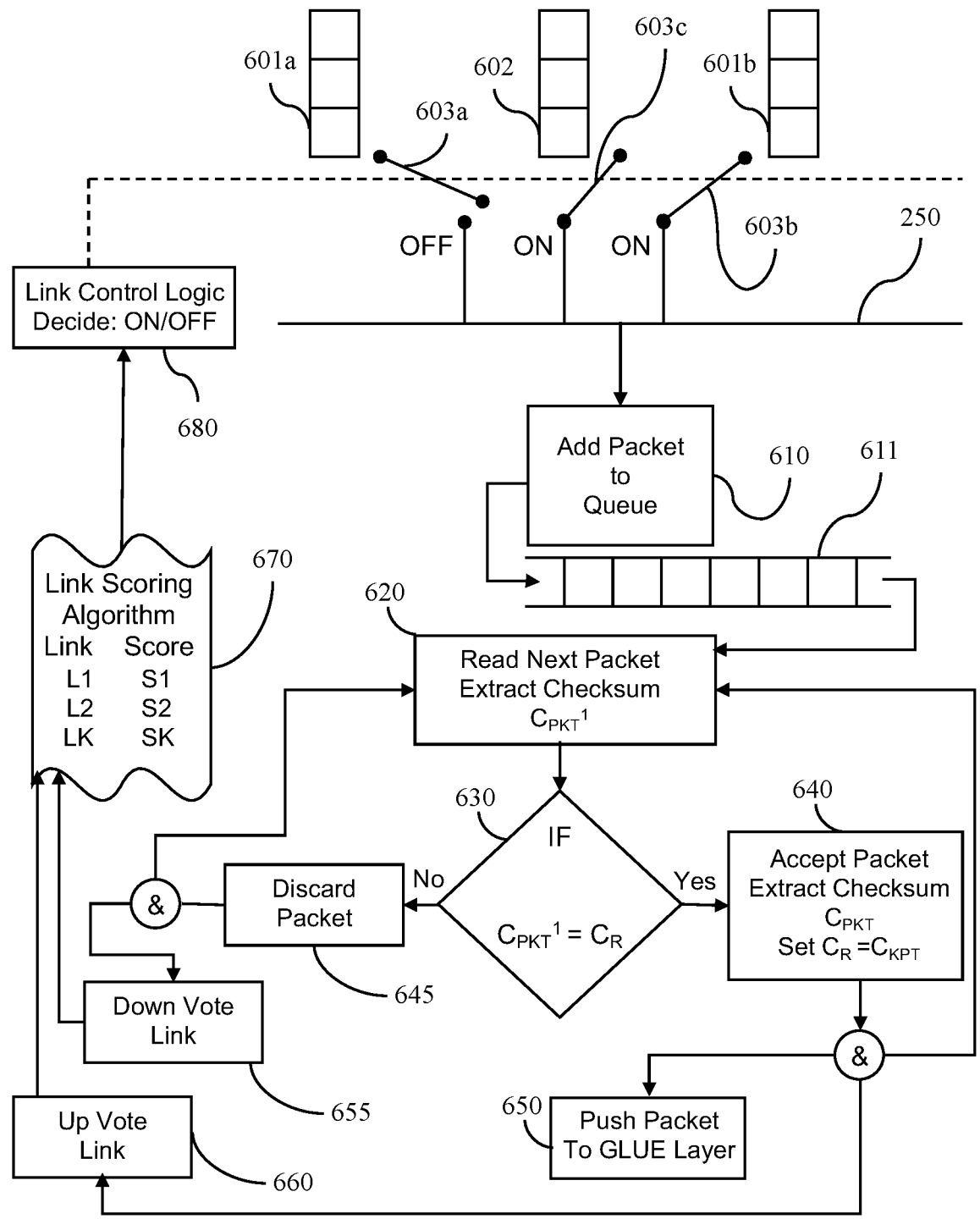
FIG. 6 is a detailed flowchart diagram of an exemplary system and method of unambiguous packet onboarding.

Referring now specifically to FIG. 6, therein illustrated is a detailed flowchart diagram of an exemplary system and method of unambiguous packet onboarding, subsequent performing the efficient checksum disambiguation as illustrated in FIG. 5 and described above. From a logical perspective, such a component or feature to provide unambiguous packet onboarding may be understood by those having ordinary skill in the art as a popularity-based conflict resolution when determining which of two or several packets which may feature identical checksums, should be utilized as a next-in-line packet. Prior to performing any steps in the method of FIG. 6 according to the systems therein, it is important for those with ordinary skill in the art to understand and recognize features of master exemplary computing devices 301, replicated peer exemplary computing devices 302, and corresponding data received and rebroadcast by replicated peer exemplary computing devices 302 to downstream devices where they are themselves behaving as master exemplary computing devices 301 (i.e., from replicated peer exemplary computing devices 302 to other, downstream, replicated peer exemplary computing devices 302), as well as whether those features indicate popularity of any given machine of master exemplary computing devices 301. Strategies for the transmission and broadcast of the data across network 250 may assist in furnishing useful measurements of this popularity to replicated peer exemplary computing devices 302 so they may evaluate and determine how to handle received data. A first strategy for the transmission and rebroadcast of data across network 250 may be transmitting or broadcasting (or "shipping") only changes or deltas. Using an algorithm to determine what has changed between two states, such as RSYNC, a second state such as $B^1$ can be compared to a first state B of data contained on master exemplary computing devices 301, which may then be transmitted or broadcast to replicated peer exemplary computing devices 302 and then later rebroadcast to downstream replicated peer exemplary computing devices 302. Another strategy may rely by determining hot/active areas, warm/mild areas, and cold/dormant areas where data may either be changing at great or low rates. Deltas alone may still be shipped, but that may instead occur only at intervals appropriate based on volume of data received over time. This may be adjusted either automatically or manually, depending on a variety of factors including relevance/importance of high-resolution timely data, business need, and complexity of data. Yet another strategy may be unsubscribing from master exemplary computing devices 301 by replicated peer exemplary computing devices 302 when a "link score" drops below a pre-determined threshold (e.g., 5) or suspending and/or holding in suspension the transmissions and/or streams from master exemplary computing devices 301 during such a drop beneath a specific link score. Effectiveness of a link may be assessed by the number of packets used downstream divided by the number of packets received from the upstream link. Similarly, a downstream device may subscribe or re-establish a streaming connection to an upstream device when a link score increases beyond this predetermined threshold. Finally, yet another strategy may be to enter a hibernation-mode and stream only from R-MAN for the purposes of "catching-up" with a master when requests from downstream devices drop below a certain threshold. As will be understood by those having skill in the art, elevating, diminishing, activating, deactivating, re-activating, and recovering streams based upon an overall measure of efficiency, speed, and reliability without manual intervention may provide significant benefits to systems which serve to replicate live databases for access and processing in a real-time, live, or close-to-live environment.

Importantly, link scores may be devised based on the variety of factors included above. By way of example and not limitation, more specific considerations may be made to assess, based on a limited amount of data, observation, and calculations on the data received by any downstream device, whether a link or upstream device is popular and should be relied upon more by said downstream devices on network 250. Sufficiently simple but reliable information with which to base this assessment may be the combination of link speed contribution, link effectiveness contribution, link reliability contribution, and link stability contribution. Measurements, recordings, and calculations of these quantities may be performed on optimization layer 311. Link speed contribution, by way of example and not limitation, may be calculated through a variety of means, including by the mean delay over the last 12 packets. Those skilled ordinarily in the art may recognize milliseconds (ms) as an appropriate measurement of packet transmission delay and observable and appropriate discrete ranges may include delays less than 1 ms, between 1 ms and 2 ms, between 2 ms and 5 ms, between 5 ms and 10 ms, between 10 ms and 25 ms, between 25 ms and 50 ms, and greater than 50 ms. Scores used computationally based on these delays may include +10, +8, +5, −1, −3, and −5, respectively, to appropriately score a link based on link speed contribution. Link effectiveness contribution may be measured, recorded, and/or calculated based upon, for instance, the number of packets from any particular link actually used by downstream devices by those received at any particular device. In other words, by answering the question: what proportion of data packets received by a device on network 250 is later adopted as next-in-line by downstream devices on network 250? Accordingly, percentages may be obtained in discrete ranges, such as 90% or greater effectiveness, greater than 75% and less than 90% effectiveness, greater than 50% and less than 75% effectiveness, greater than 25% and less than 50% effectiveness, greater than 10% and less than 25% effectiveness, and less than 10% effectiveness. Example scores to assign in use computing overall link score for any given link, based on these discrete ranges may be +10, +5, +2, +1, −2, and −5. Link reliability contribution may be measured, recorded, and/or calculated based upon, for instance, the division of the number of distinct checksums transmitted over a link in a 60 second period versus the number of packets received by the linked device. If, for instance 98% or greater of packets received correspond to checksums successfully transmitted via the link, the link may be considered very reliable and receive, for example a +8 contribution to overall link score based on link reliability. Other values may include percentages between 75% and 98% may receive +3 link score contribution, between 50% and 75% may receive +1 link score contribution, between 20% and 50% may receive 0 link score contribution, between 10% and 20% may receive −2 link score contribution, and less than 10% may receive −7 link score contribution, based upon overall link reliability percentage. Link stability contribution may be measured, recorded, and/or calculated based upon, for instance the divergence from the standard deviation of all link scores of a given link. For instance, over the last 120 seconds, a device or link in network 250 has varied wildly in terms of overall link score, it may be downgraded accordingly. If it has remained stable, it may be upgraded accordingly. Example discrete categories according to link stability may include those having standard deviation of link scores less than 3 may be assigned a +5 link stability contribution, those having standard deviation of link scores greater than 3 but less than 5 may be assigned a +2 link stability contribution, those having standard deviation of link scores greater than 5 but less than 10 may be assigned a 0 link stability contribution (no contribution to score), and those having standard deviation of link scores greater than 10 may be downgraded or assigned a −2 link stability contribution. If each link assumes a baseline link score (i.e., a default link score) of, for instance, 15, this link score may be adjusted upward and downward through the addition of these measured, recorded, and/or calculated scores to raise and lower the total link score. At certain thresholds, these links may then be either relied upon more or less, depending on the thresholds and scores of links on network 250.

Turning now to those features specifically illustrated therein FIG. 6, atop the diagram therein illustrated may be a series of master exemplary computing devices 301 and replicated peer exemplary computing devices 302. Specifically, examples of first master computing device 601a, second master computing device 601b, and replicated peer computing device 602. As may be understood by those having skill in the art, each of first master computing device 601a, second master computing device 601b, and replicated peer computing device 602 may be in receipt of or actively receiving packets from upstream devices and/or devices which transmit data regarding users/subscriber activity for analysis among devices on network 250. Therefore, each of first master computing device 601a, second master computing device 601b, and replicated peer computing device 602 may serve as master or replicated peer devices for others upstream, downstream, or both, which may require resolution of which packet to add to sliding window 510 as next-in-line. This may be accomplished in advance of transmission by turning links to downstream devices off based on popularity or on the back end by assessing popularity any device on network 250, based solely upon data received at replicated peer exemplary computing devices 302. Links from first master computing device 601a, second master computing device 601*b*, and replicated peer computing device 602 to downstream devices on network 250 may turned off utilizing first downstream link switch 603*a*, second downstream link switch 603*b*, and third downstream link switch 603*c*, respectively. Those having ordinary skill in the art may understand that first downstream link switch 603*a*, second downstream link switch 603*b*, and third downstream link switch 603*c* may be physical or algorithmic, software, instruction-based, virtual, and/or combinations thereof switches. Messages, packets, and/or data transmitted and/or broadcasted to network 250 may then arrive at a downstream device and added to queue 611 at queuing step 610 for processing at later steps in the disclosed method on the disclosed system. The next steps in the method herein illustrated may be the reading each packet in queue 611, sequentially, according to order of arrival at replicated peer exemplary computing devices 302. While reading the packet upon arrival, replicated peer exemplary computing devices 302 may further extract checksum $C_{PKT}^1$, or the first checksum in queue 611. Both the reading and extraction steps may be performed in parallel or series during reading/extraction step 620. Then, having extracted $C_{PKT}^1$, replicated peer exemplary computing devices 302 may compare $C_{PKT}^1$ with $C_R$ in order to assess whether they are the same at comparison step 630. Then if $C_{PKT}^1$ equals $C_R$, replicated peer exemplary computing devices 302 may accept the received packet, extract checksum $C_{PKT}$ and set $C_R$ equal to $C_{KPT}$ at acceptance step 640. Once accepted, replicated peer exemplary computing devices 302 may broadcast the packet using optimization layer 311 to suitable downstream devices at broadcast step 650 and replicated peer exemplary computing devices 302 may continue through queue 611 by repeating reading/extraction step 620. The further steps beginning at upvoting step 660 can then proceed to influence the overall popularity of the device on network 250, recognizing the successful next-in-line packet addition to queue 611. If instead, at comparison step 630, $C_{PKT}^1$ does not equal $C_R$, the packet may be discarded at discard step 645, notably skipping broadcast step 650 and not broadcasting the packet to optimization layer 311. Simultaneously, instructions or messages to cause downvoting of the according link may be taken as downvoting step 655. Finally, having received information about packet handling across master exemplary computing devices 301 and replicated peer exemplary computing devices 302, link scoring algorithm 670 may compute individual link scores for each link of each of master exemplary computing devices 301 and replicated peer exemplary computing devices 302 in order to inform link control logic 680, thereby controlling links among master exemplary computing devices 301 and replicated peer exemplary computing devices 302 on network 250.

Thus, as it may be recognized by those skilled in the art, suitable data may be arranged across devices on network 250 such that many or all may be relied upon for determining business intelligence on up-to-the-second data. For instance, queries such as all users having performed a specified action within X minutes of a query, all subscribers who have been most active according to a threshold degree over the last number of X minutes, all users who have been dormant over the last X minutes, or the subscribers with the most volume of data usage over the last X minutes may not only be reliably obtained, but may be done without significant stress on devices and links among devices on network 250. In other words, obtaining certain user or subscriber-level business sights may become much quicker and easier. It should further be recognized that those devices which do not have sufficient up-to-the-second data due to, for instance, receiving a downgraded link score, may require recovery to real-time status. This can be achieved through a "dancing" recovery scheme as outlined herein. Replicated peer exemplary computing devices 302 in live streaming state may be assumed to have a live streaming line from master exemplary computing devices 301 and may continue receiving state changes and/or deltas from master exemplary computing devices 301 which are contained inside packets moved over physical layer 313. Each of replicated peer exemplary computing devices 302 are understood by those having skill in the art as receiving, on a constant and continuous basis, incoming data streams from upstream replicated peer exemplary computing devices 302 and/or master exemplary computing devices 301, each carrying data from the same source(s). Next-in-line packets arriving on any incoming transmission lines may be onboarded, provided it is recognized as next in the stream sequence according to the steps and system described herein, the delta according to the packet may be applied at each of replicated peer exemplary computing devices 302, and acknowledgement of receipt may be transmitted to each of master exemplary computing devices 301. The incoming streaming lines, as detailed above, may also be terminated if a link score drops below a certain threshold, as a means to evaluate whether any given link is worth the resources required to maintain it. If all active streaming lines at any given of replicated peer exemplary computing devices 302 cease to be worth system resources to maintain, according to said threshold, the individual of replicated peer exemplary computing devices 302 may establish an out-of-band dedicated streaming line with a recovery manager (e.g., RMAN), to work for a specific lease time instead of quality-of-service-based adaptive scoring at RMAN so that it can recover in epochs. While amidst recovery, the individual out-of-band device of replicated peer exemplary computing devices 302 may periodically attempt to negotiate a live stream with any of master exemplary computing devices 301 by providing its last checkpoint. A negotiation may be successful if it drops the lease line with the recovery manager (RMAN). Since recovery of replicated peer exemplary computing devices 302 is being accomplished through recovery manager simultaneous with attempts at establishing orderly function with the system and methods herein described, it may be thought of as "dancing" with recovery manager and master exemplary computing devices 301 until it can be incorporated as one of replicated peer exemplary computing devices 302 normally functioning with communication with one or more of master exemplary computing devices 301. Furthermore, this ensures failing or otherwise inefficient replicated peer exemplary computing devices 302 do not strain network 250, the devices thereon network 250, but remains capable of rejoining network 250 upon re-establishment of live streaming.

With respect to the above description then, it is to be realized that the optimum methods, systems and their relationships, to include variations in systems, machines, size, materials, shape, form, position, function and manner of operation, assembly, order of operation, type of computing devices (mobile, server, desktop, etc.), type of network (LAN, WAN, internet, etc.), size and type of database, data-type stored therein, and use, are intended to be encompassed by the present disclosure.

It is contemplated herein that the system and method may be used to automate the creation and maintenance of a system and method for robust, efficient, adaptive streaming replication application protocol with dancing recovery for high-volume distributed live subscriber datasets, as well as automating a variety of other tasks. Furthermore, the systems and methods disclosed herein may be used to organize, retrieve, and otherwise manage a variety of data types, including but not limited to subscriber data, customer data, user data, employee data, sales data, lead data, logistic event data, order data, inventory information and data, the like and combinations thereof. It is further contemplated that a variety of computing devices may be deployed on the system and method by a variety of service providers, managers, users, owners, agents, companies and other enterprises. These may include but are not limited to personal computers, laptops, desktops, mobile devices, smart phones, tablets, servers, virtualized machines, the like and/or combinations thereof. It is further contemplated that specialized equipment may be deployed to further improve the disclosed system and method. This description includes all manners and forms of systems and method for the robust, efficient, adaptive streaming replication, in all manner of devices and software platforms capable of such adaptive streaming and replication of live databases in order to automate, streamline, decrease runtime, increase efficiency of, and/or make possible the dancing recovery protocol as herein described. While the implementation of the disclosed system and method may be most applicable and/or relevant to ERP databases, many platforms may benefit from the disclosed system and method, including but not limited to Customer Relationship Managers (CRMs), Information Technology (IT) support and implementation software, database management software, accounting software, other business and consumer software products which may store data across multiple live databases, archival databases, the like and/or combinations thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A system for an adaptive streaming replication of a first at least one computing device to a plurality of computing devices, the system comprising:

the first at least one computing device having a first processor, a first memory, a first non-transitory computer readable medium, and a first connection to a network, said first at least one computing device is configured to:
  receive, via said first connection to said network, a primary plurality of data in a series of data packets from a plurality of data sources;
  store said plurality of data on said non-transitory computer readable medium; and
  transmit a secondary plurality of data to a device on said network via said first connection to said network;

the plurality of computing devices, each having a processor, a memory, a non-transitory computer readable medium, and a connection to said network, said plurality of computing devices are configured to receive, via said second connection to said network, said secondary plurality of data from at least said first at least one computing device; and a streaming replication application installed thereon said first non-transitory computer readable medium and said second non-transitory computer readable medium, which in combination with said first processors and said processors and said network are configured to:
  maintain on each of the plurality of computing devices a sliding window of "N" packets received by any of the first at least one computing device and the plurality of computing devices, said sliding window of "N" packets is a subset of said series of data packets;
  compute a checksum at the first at least one computing device according to each of said series of data packets prior to transmission to said network;
  add said checksum to a header of each of said series of data packets and transmit each of said series of data packets in an order of receipt to said network;
  broadcast each of said series of data packets, having said checksum in said header, to the plurality of computing devices via said network in order of receipt by the first at least one computing device;
  receive each of said series of data packets, each having said header with said checksum, at each of the plurality of computing devices;

for a next-in-line packet received at any of the plurality of computing devices, determine whether said next-in-line data packet exists within said sliding window of "N" packets;

add said next-in-line packet to said sliding window of "N" packets only when said checksum does not exist within said sliding window;

calculate a link score of the first at least one computing device, said link score is calculated by adding a link speed contribution score, a link effectiveness contribution score, a link reliability contribution score, and a link stability contribution score; and instruct each of the plurality of computing devices to subscribe to the first at least one computing device when said link score is above a threshold.

2. The system of claim 1, wherein said streaming application is further configured to generate a link score for said first at least one computing device, said link score is generated by said streaming application by adding together a link speed contribution score, a link effectiveness contribution score, a link reliability contribution score, and a link stability contribution score.

3. The system of claim 2, wherein said streaming application is configured to suspend a transmission of new packets based upon a threshold minimum link score.

4. The system of claim 3, wherein said link speed contribution score is an integer between (−)5 and (+)10, said link effectiveness contribution score is an integer between (−)5 and (+)10, said link reliability contribution score is an integer between (−)7 and (+)8, and said link stability contribution score is an integer between (−)2 and (+)5, and said streaming application is configured to begin with said link score of 15.

5. The system of claim 4, wherein said link speed contribution score corresponds to a mean delay of the first computing device over a span of a most recent 12 packets, said link effectiveness contribution score corresponds to a number of packets onboarded onto the plurality of computing devices divided by a number of packets transmitted by the first computing device, said link reliability contribution score corresponds to a volume of checksums performed within a 60 second period divided by a number of packets received at the first computing device, and said link stability contribution score corresponds to a standard deviation of a change in said link score over a 120 second period.

6. The system of claim 5, wherein said streaming application is configured to establish a connection with a recovery manager connected to said network upon a suspension of said transmission of new packets based upon said threshold minimum link score.

7. The system of claim 6, wherein said streaming application is configured to perform a periodic check of the first computing device with the plurality of computing devices connected to said network in order to re-establish a connection within said sliding window of "N" packets.

8. The system of claim 7, wherein said streaming application is configured to calculate said link score for each of the plurality of computing devices.

9. The system of claim 8, wherein said streaming application is configured to elevate an at least one of the plurality of computing devices to a master computing device, based upon said link score of each of the plurality of computing devices.

10. The system of claim 1, wherein said first at least one computing device is a plurality of master computing devices, each connected with the plurality of computing devices.

11. The system of claim 1, wherein said streaming application is further configured to generate a link score for the plurality of computing devices, said link score is generated by said streaming application by adding together a link speed contribution score, a link effectiveness contribution score, a link reliability contribution score, and a link stability contribution score.

12. The system of claim 11, wherein said streaming application is configured to suspend a transmission of new packets based upon a threshold minimum link score.

13. The system of claim 1, wherein said streaming application is further configured to broadcast from a first at least one of the plurality of computing devices said next-in-line packet to a second at least one of the plurality of computing devices, said next in line packet upon confirmation that said checksum is not detected in said sliding window.

14. The system of claim 13, wherein said streaming application is further configured to generate a link score for the plurality of computing devices, said link score is generated by said streaming application by adding together a link speed contribution score, a link effectiveness contribution score, a link reliability contribution score, and a link stability contribution score.

15. The system of claim 11, wherein said streaming application is configured to suspend a transmission of new packets based upon a threshold minimum link score.

16. A method for an adaptive streaming replication of an at least one master computing device, the at least one master computing device receiving a plurality of data received as a plurality of packets from a plurality of sources, to a plurality of replicated peer computing devices on a network, the method comprising:

maintaining a sliding window of "N" packets received at each of the plurality of replicated peer computing devices from the at least one master computing device, according to the plurality of data received therein, where said sliding window of "N" packets is a most recent "N" subset of the plurality of packets;

computing a checksum upon each of the plurality of packets;

adding said checksum to a header of each of the plurality of packets;

broadcasting each of said plurality of packets, having said checksum in said header, to the plurality of replicated peer computing devices via said network in order of receipt by the at least one master computing device;

receiving at each of the plurality of replicated peer computing devices, a next-in-line packet having a new checksum from the at least one master computing device;

for said next-in-line packet, determining whether said next-in-line packet exists within said sliding window of "N" packets;

adding said next-in-line packet to said sliding window of "N" packets only when said new checksum does not exist in said sliding window of "N" packets;

calculating a link score of the at least one master computing device, said link score is calculated by adding a link speed contribution score, a link effectiveness contribution score, a link reliability contribution score, and a link stability contribution score; and instructing each of the plurality of replicated peer computing devices to subscribe to the at least one master computing device when said link score is above a threshold.

17. The method of claim 16, further comprising the steps of:
- calculating a peer link score for each of the plurality of replicated peer computing devices, said peer link score is calculated by adding a link speed contribution score, a link effectiveness contribution score, a link reliability contribution score, and a link stability contribution score; and
- elevating each of the plurality of replicated peer computing devices having a peer link score above said threshold to become an additional master computing device.

18. The method of claim 17, further comprising the step of activating a recovery manager for each of the at least one master computing device and the plurality of replicated peer computing devices having a link score or peer link score beneath said threshold.

19. The method of claim 18, further comprising the step of performing a periodic check of the at least one master computing device and the plurality of replicated peer computing devices having an activated said recovering manager in order to re-establish a connection within said sliding window of "N" packets.

\* \* \* \* \*